Aug. 19, 1952     W. L. BOND     2,607,272
COMPOSITE WAVE PLATE FOR LIGHT

Filed Feb. 11, 1949     2 SHEETS—SHEET 1

INVENTOR
W. L. BOND
BY Stanley B. Kent
ATTORNEY

Aug. 19, 1952     W. L. BOND     2,607,272
COMPOSITE WAVE PLATE FOR LIGHT
Filed Feb. 11, 1949        2 SHEETS—SHEET 2
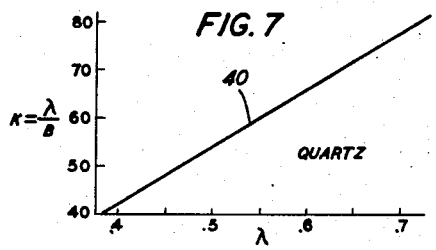
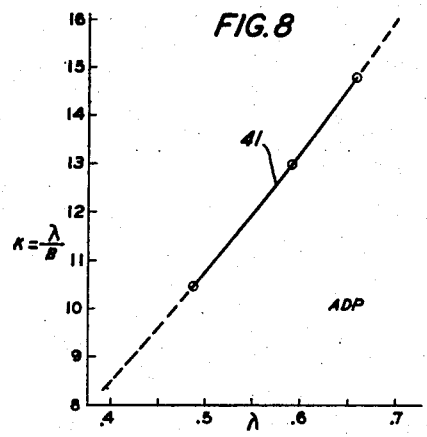
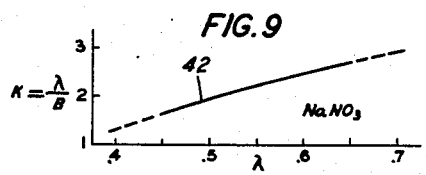
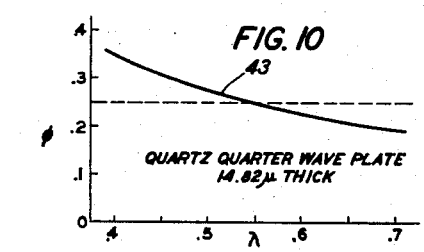
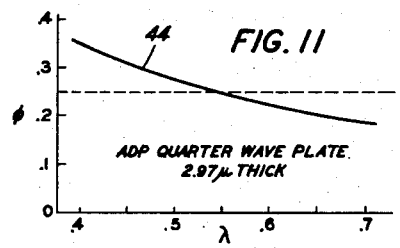
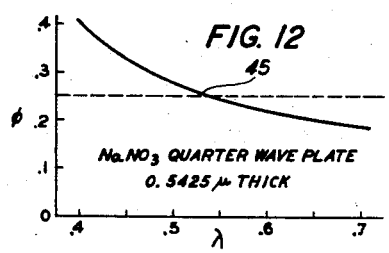
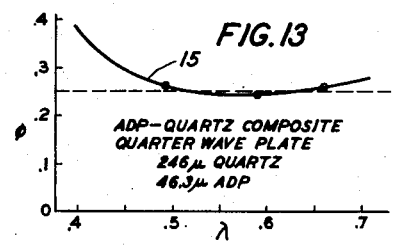
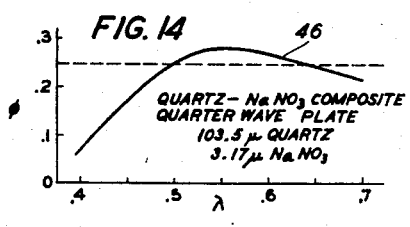
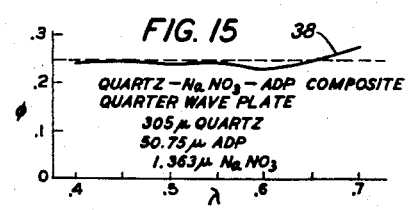
INVENTOR
W. L. BOND
BY
*Stanley B. Kent*
ATTORNEY Patented Aug. 19, 1952

2,607,272

UNITED STATES PATENT OFFICE 2,607,272

COMPOSITE WAVE PLATE FOR LIGHT

Walter L. Bond, Summit, N. J., assignor to Bell Telephone Laboratories, Incorporated, New York, N. Y., a corporation of New York Application February 11, 1949, Serial No. 75,877

8 Claims. (Cl. 88—65)

This invention relates to composite birefringent crystalline wave plates.

Crystalline wave plates of various kinds are well-known in the prior art, a specific example of such a wave plate being the well-known quarter-wave plate. Quarter-wave plates are used for producing or detecting circularly polarized light. Such wave plates of split mica or quartz are described on page 357 of the book by Jenkins and White entitled "Fundamentals of Physical Optics," first edition, McGraw-Hill Book Company, Incorporated, New York, New York, 1937. These wave plates show marked color effects with white light as explained on page 362 of the Jenkins and White book. This color producing characteristic limits the field of usefulness of such prior art plates.

An object of the present invention is the provision of improved wave plates in which the color effects are controllable.

A more specific object of the present invention is to provide improved achromatic wave plates, the term achromatic being used in the sense of producing equal effects on light waves comprising two wavelengths.

Another specific object is the provision of an apochromatic quarter-wave plate, the term apochromatic being used in the sense of producing equal effects for light waves of three different wavelengths.

These objects are attained by utilizing wave plates of different birefringent crystalline materials of suitable thicknesses and assembling these plates into a composite wave plate. The major faces of the individual plates are ground and polished to substantially optically flat surfaces and assembled face to face in any suitable manner as by cementing. The several plates are so oriented with respect to each other as to produce the desired effect. Uniaxial or biaxial birefringent crystals may be used. If uniaxial crystals are used, the individual plates are cut preferably so that the major faces are parallel to the optic axis and the individual plates are oriented so that one plate compensates another. If positive and negative crystals are used together, the plates are oriented so that the optic axes are parallel.

In an illustrative embodiment of the invention comprising uniaxial crystalline plates the major surfaces of the plates are substantially parallel to a principal section of the crystal from which the plates are cut. A "principal section" of a birefringent crystal as the term is used in this application is a plane through an optic axis and normal to a crystal surface. The foregoing terminology conforms to that used on page 323 of the Jenkins and White book identified hereinbefore. However, all that is necessary is that the major faces are substantially parallel to the optic axis.

Three illustrative embodiments of the invention will be described hereinafter. From this description it will be obvious how other embodiments may be designed using other crystalline material and other cuts for the plates.

The invention will now be described in more detail having reference to the accompanying drawings.

Figs. 7, 8 and 9 are graphs showing certain characteristics of quartz, ammonium dihydrogen phosphate and sodium nitrate crystal plates, respectively, which are useful in constructing wave plates according to this invention.

Figs. 10, 11 and 12 are graphs showing the phase difference between the ordinary and extraordinary rays versus wavelengths for monochromatic quarter-wave plates, respectively, of quartz, ammonium dihydrogen phosphate and sodium nitrate.

Fig. 13 is a graph showing the phase difference between the ordinary and extraordinary rays versus wavelengths for the achromatic quarter-wave plate of Fig. 1.

Fig. 14 is a graph showing the phase difference between the ordinary and extraordinary rays versus wavelengths for an achromatic quarter-wave plate comprising a quartz plate and a sodium nitrate plate.

Fig. 15 is a graph showing the phase difference between the ordinary and extraordinary rays versus wavelengths for an apochromatic quarter-wave plate comprising plates of quartz, ammonium dihydrogen phosphate and sodium nitrate.

Figure 1:
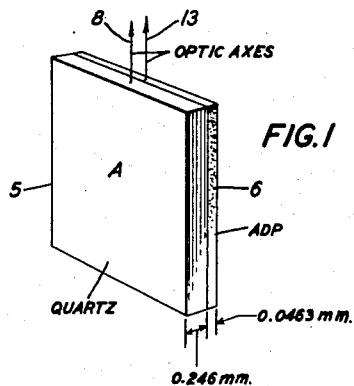
Fig. 1 illustrates schematically an achromatic quarter-wave plate comprising a quartz plate and an ammonium dihydrogen phosphate plate.

Referring now to Fig. 1 a composite wave plate A is illustrated schematically which comprises a quartz (SiO₂) plate 5 and an ammonium dihydrogen phosphate (NH₄H₂PO₄) plate 6 which material for convenience is referred to hereinafter as ADP. These plates have major faces which are ground and polished substantially optically flat. Two major faces are located parallel and close together. They may be and preferably are cemented together by suitable transparent cement such as Canada balsam. The joined plates may be provided with a suitable frame to prevent damage during use the only requirement being that the outside major faces are exposed so that light incident on one outside major face may pass through the plates to emerge from the other outside major face.

Figure 4:
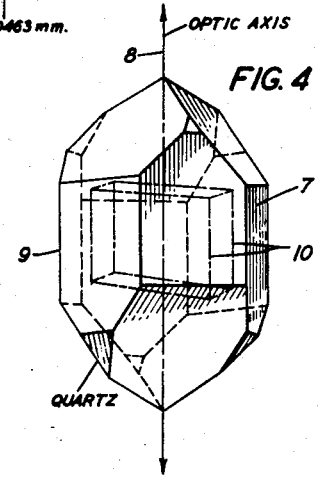
Fig. 4 shows a typical quartz crystal from which quartz plates for use in this invention may be cut.

The quartz plate 5 is cut from a quartz crystal 7 as shown in Fig. 4. The quartz crystal 7 is a typical form of quartz crystal found in the natural state. It shows the characteristic six prismatic faces of a regular hexagonal prism. The optic axes are parallel to the lateral edges, for example, the optic axis 8 is parallel to the lateral edge 9. Most quartz crystals, however, have such imperfect faces that an edge might be five degrees from the optic axis. The quartz plate 5 corresponds, for example, to the portion of the crystal 7 represented by the dot-dash line 10. The major faces of the quartz crystal 5 are parallel to the optic axis 8 and normal to a pair of the prismatic faces of the crystal 7.

Figure 5:
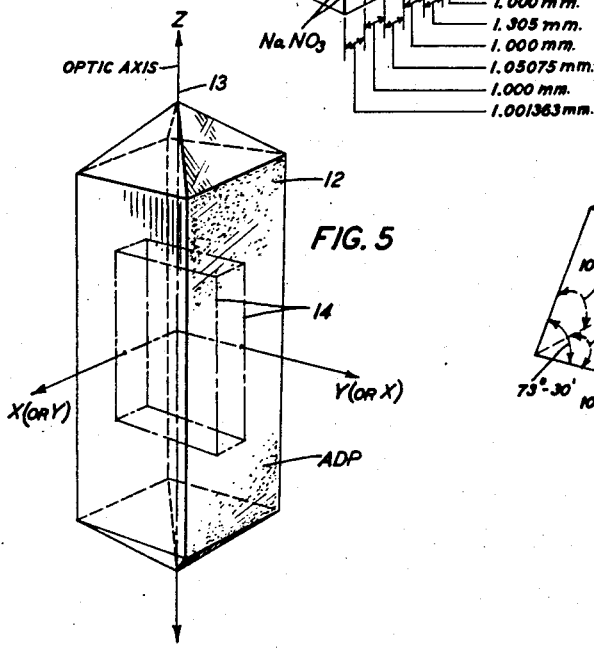
Fig. 5 shows similarly an ammonium dihydrogen phosphate crystal from which ammonium dihydrogen phosphate plates for use in this invention may be cut.

The ADP plate 6 is cut from an ADP crystal 12 as shown in Fig. 5. The ADP crystal 12 is of typical prismatic tetragonal scalenohedral form with four major prismatic faces and with four cap faces at each end. The optic axis is parallel to the line extended between the apices of the cap faces, for example, the optic axis 13 which coincides with a line between the apices. The ADP plate 6 corresponds, for example, to the portion of the crystal 12 represented by the dot-dash line 14. The major faces of ADP plate 6 are parallel to the optic axis and normal to a pair of faces of the crystal 12.

As shown in Fig. 1 the quartz plate 5 and the ADP plate 6 are assembled with their optic axes parallel since the two crystals differ in optical sign. Quartz is uniaxial positive since the velocity of the extraordinary ray is greater than that of the ordinary ray while ADP is uniaxial negative since the velocity of the extraordinary ray is smaller than that of the ordinary ray. Therefore for quartz $(\epsilon - \omega)$ is positive and for ADP $(\epsilon - \omega)$ is negative where the indices of refraction for the extraordinary and ordinary rays are represented respectively by $\epsilon$ and $\omega$, following the nomenclature of the International Critical Tables. The thickness of the quartz plate 5 is 0.246 mm. (millimeter) and the thickness of the ADP plate 6 is 0.0463 mm. This composite plate A has a phase difference characteristic between the ordinary and extraordinary emerging rays versus wavelengths of the transmitter light as shown by the graph 15 of Fig. 13 where $\varphi$ represents this phase difference and $\lambda$ represents the wavelength of the light in microns. For light near the center of the visible spectrum where the wavelength is 0.55 micron $(\lambda = 0.55\mu)$ the phase difference between the ordinary and extraordinary rays is substantially 0.25 or one-quarter wavelength. In Fig. 13 from $\lambda = 0.50\mu$ to $\lambda = 0.65\mu$ graph 15 departs only slightly from $\varphi = 0.25$. The method of determining these characteristics will be described hereinafter.

In the device of Fig. 1 the ADP plate 6 is so thin that it is extremely fragile. The quartz plate 5 is also thin but not unduly so when properly supported. In the modified form of quarter-wave plate shown in Fig. 2, the disadvantage of very thin plates has been obviated by the use of a properly oriented additional ADP plate. The composite wave plate A' illustrated schematically in Fig. 2, comprises a quartz plate 16, an ADP plate 17 and a second slightly thinner ADP plate 18. The quartz plate 16 is identical with quartz plate 5 of Fig. 1. The ADP plate 17 is thicker than the ADP plate 18 by an amount equal to the thickness of the ADP plate 6 of Fig. 1. In other words ADP plate 18 is 1.0000 mm. thick which is rugged enough for easy handling and ADP plate 17 is 1.0463 mm. thick. These plates may be cut from quartz and ADP crystals in the same manner as explained for the plates of Fig. 1. The major faces of plates 16, 17 and 18 are ground and polished substantially optically flat. One major face of ADP plate 17 is cemented to one major face of quartz plate 16 with their optic axes 8 and 13 parallel. One major face of the second ADP plate 18 is cemented to the second major face of ADP plate 17 with the optic axes 13 and 13' of ADP plates 17 and 18, respectively, at 90 degrees to each other. So far as causing a phase difference between the emerging ordinary and extraordinary rays is concerned, the two plates of different thicknesses with their optic axes at 90 degrees produce the same phase differences as a single plate of thickness equal to the difference in thicknesses of the two plates. The effective thickness of the pair of crossed ADP plates is thus seen to be their difference in thickness, and the effective direction of the optic axis is the orientation of the optic axis of the thicker of the two crossed crystals.

Figure 2:
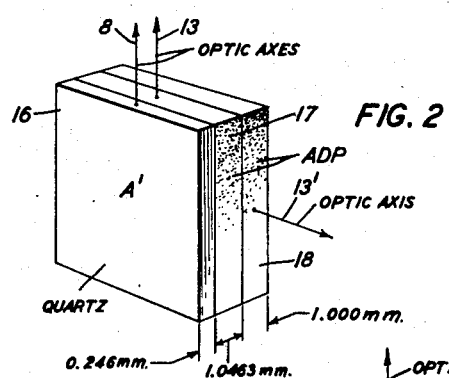
Fig. 2 illustrates similarly a modified achromatic quarter-wave plate comprising a quartz plate and two ammonimum dihydrogen phosphate plates.

The phase difference characteristic of the composite quarter-wave plate A' of Fig. 2 is the same as that of the quarter-wave plate A of Fig. 1 and is shown by the graph 15 of Fig. 13.

Figure 3:
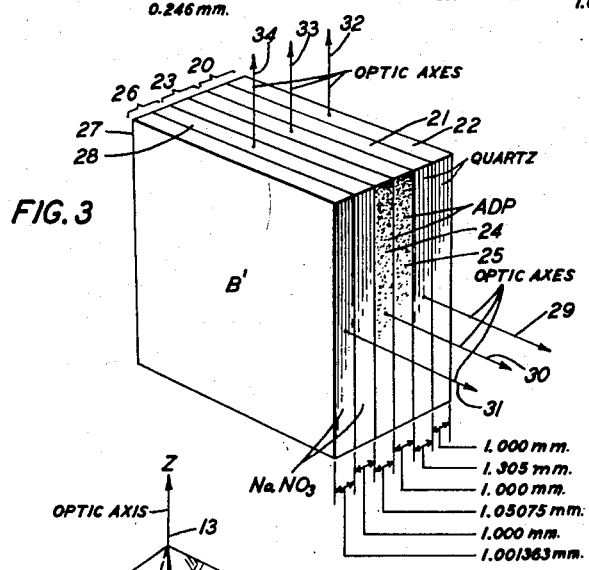
Fig. 3 illustrates schematically an apochromatic quarter-wave plate comprising two plates each of quartz, ammonium dihydrogen phosphate and sodium nitrate.

The composite wave plate of Fig. 3 is an apochromatic quarter-wave plate, the term apochromatic being used in a sense analogous to its use with reference to lenses meaning that the phase difference of the ordinary and extraordinary emerging rays is the same for three different wavelengths of light. The apochromatic quarter-wave plate B' illustrated schematically in Fig. 3 comprises three pairs of crystal plates respectively of quartz, ADP and sodium nitrate. The plates of each pair differ in thickness sufficiently to effect the necessary phase differences. The pair 20 of quartz plates comprises a thicker plate 21 and a thinner plate 22. The pair 23 of ADP plates comprises a thicker plate 24 and a thinner plate 25. The pair 26 of sodium nitrate (NaNO₃) plates comprises a thicker plate 27 and a thinner plate 28. The optic axes represented by the lines 29, 30 and 31 of the thicker plates 21, 24 and 27, respectively, in the assembled device are all parallel. The optic axes represented by the lines 32, 33 and 34 of the thinner plates 22, 25 and 28, respectively, in the assembled device are all parallel but at right angles to the optic axes of the thicker plates. The major faces of all of the plates are ground and polished substantially optically flat. Adjacent major faces may be and preferably are cemented together by suitable transparent cement such as Canada balsam.

Figure 6:
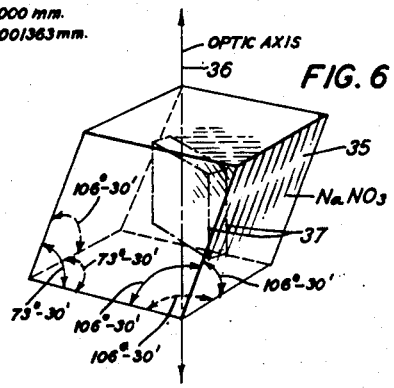
Fig. 6 shows a typical sodium nitrate crystal from which sodium nitrate plates for use in this invention may be cut.

For the composite wave plate B' of Fig. 3, the thinner plates 22, 25 and 28 are each 1.000 mm. thick which is a convenient thickness for cutting, grinding, polishing and handling. The slightly thicker plates 21, 24 and 27 are also of a convenient thickness. Quartz plate 21 is 1.305 mm. thick. ADP plate 24 is 1.05075 mm. thick. Sodium nitrate plate 27 is 1.001363 mm. thick. The quartz and ADP plates are cut respectively from the quartz and ADP crystals as illustrated and described with reference to Figs. 4 and 5. The sodium nitrate plates 27 and 28 are cut from a sodium nitrate crystal 35 as shown in Fig. 6. The sodium nitrate crystal 35 is of typical rhombohedral form bounded by six parallelograms, the angles of which are 106° 30' and 73° 30', respectively. Two of the solid angles diametrically opposite are formed by the junction of three obtuse angles, while each of the remaining six angles is bounded by one obtuse and two acute angles. The optic axis is parallel to a line through the apices of the two solid angles formed by the junction of the three obtuse angles, one optic axis being represented by the line 36 in Fig. 6. The sodium nitrate plates 27 and 28 correspond for example to the portion of the crystal 35 represented by the dot-dash lines 37. The major faces of the sodium nitrate plates 27 and 28 are parallel to the optic axis and perpendicular to a pair of opposite faces of the crystal 35.

The phase difference characteristic of the composite quarter-wave plate B' of Fig. 3 is shown by graph 38 of Fig. 15. The thicknesses of the individual plates of the composite plate B' were chosen to effect a phase difference of 0.25 at wavelengths of $\lambda=0.45\mu$, $\lambda=0.55\mu$ and $\lambda=0.65\mu$. This composite wave plate is apochromatic for light of the three wavelengths given and is very nearly achromatic for all wavelengths from $\lambda=0.4\mu$ to $\lambda=0.68\mu$.

The three specific composite wave plates of Figs. 1, 2 and 3 which have been described hereinbefore are merely illustrative embodiments of this invention. Other embodiments may be developed as will be obvious from the method now to be described which was used in designing these specific embodiments.

Light passing through a nonisometric crystal will in general travel at a velocity that depends on the direction of "light vibration" (the direction of light vibration can be taken as the direction of the electric displacement). For a given direction of propagation there is a direction of vibration that gives a greatest velocity of propagation and a vibration direction that gives a lowest velocity of propagation. These two vibration directions and the direction of normal propagation are mutually perpendicular. Light entering such a crystal will break up into two components, one vibrating along the direction that gives fastest propagation and one vibrating along the direction that gives slowest propagation. Hence such a plate can be used to establish a phase difference between two components thus giving elliptically polarized light.

If the path length in the crystal is $t$ and the light wavelength in vacuum is $\lambda$ there are in the crystal $$\frac{tn_f}{\lambda}$$

waves that vibrate along the direction for fast propagation and $$\frac{tn_s}{\lambda}$$

waves that vibrate in the direction for slow propagation, $n_f$ and $n_s$ being the refractive indices for fast and slow propagation, respectively. The phase difference after emergence is represented by the equation $$\varphi = \frac{t}{\lambda}(n_f - n_s) \qquad (1)$$

where $\varphi$ is the phase difference after emergence. Since the birefringence may be represented as the difference in the fast and slow refractive indices, the birefringence may be represented by the equation $$B = (n_f - n_s) \qquad (2)$$

where B is the birefringence of the crystal. From Equations 1 and 2, it follows that $$\varphi = \frac{Bt}{\lambda} \qquad (3)$$

If the phase difference $\varphi$ is made a quarter wavelength, the plates can be used to give circularly polarized light. However, due to the nature of the variation of $n_f$ and $n_s$ with $\lambda$ it is found that $$\frac{B}{\lambda}$$

varies with $\lambda$ and hence such a quarter-wave plate is a quarter-wave plate for only one color of light. According to this invention, it has been found possible to combine two or more crystalline materials so that $$\frac{B}{\lambda}$$

is less dependent on $\lambda$ in some range of values of $\lambda$.

Three such crystalline materials are quartz, ADP (ammonium dihydrogen phosphate) and sodium nitrate. These materials are used here merely as examples and not in a limiting sense since other crystalline materials may be used. The constants of these three materials which are used in designing composite wave plates according to this invention, as obtained from the International Critical Tables are as follows:

*Table*

| | $\lambda$ | $\omega$ | $\epsilon$ | $B = \omega - \epsilon$ | $k = \lambda/B$ |
|---|---|---|---|---|---|
| Quartz (SiO$_2$) | .4861F | 1.549683 | 1.558979 | −.009296 | −52.29 |
| | .5893D | 1.544246 | 1.553355 | −.009109 | −64.69 |
| | .6563C | 1.541899 | 1.550929 | −.009030 | −72.68 |
| ADP (NH$_4$H$_2$PO$_4$) | .4861F | 1.5314 | 1.4847 | .0467 | 10.43 |
| | .5893D | 1.5246 | 1.4792 | .0454 | 12.99 |
| | .6563C | 1.5212 | 1.4768 | .0444 | 14.77 |
| Sodium nitrate (NaNO$_3$) | .4861F | 1.5998 | 1.3384 | .2614 | 1.86 |
| | .5893D | 1.5848 | 1.3360 | .2488 | 2.37 |
| | .6563C | 1.5791 | 1.3317 | .2444 | 2.69 |

In the above table of constants the refractive index for the ordinary ray, that is, for the ray vibrating perpendicular to the optic axis is represented by "$\omega$" and the refractive index for the extraordinary ray, that is, the ray vibrating along the optic axis is represented by "$\epsilon$". In quartz the ordinary ray travels with the greater velocity, therefore in Equation 1 for quartz $n_f = \omega$ and $n_s = \epsilon$. In ADP and sodium nitrate, the extraordinary ray travels with the greater velocity, therefore in Equation 1 for ADP and sodium nitrate $n_s = \omega$ and $n_f = \epsilon$. If the values of $$\frac{\lambda}{B}$$

are plotted as ordinates against $\lambda$ as abscissae, the graphs for quartz, ADP and sodium nitrate are approximately straight lines. Such graphs are shown respectively for quartz by graph 40 of Fig. 7, for ADP by graph 41 of Fig. 8 and for sodium nitrate by graph 42 of Fig. 9.

If $k$ is substituted for $$\frac{\lambda}{B}$$

of Equation 3, this equation becomes $$\varphi = \frac{t}{k}$$

From Equation 4 the necessary thickness $t$ to give any desired phase difference $\varphi$ may be computed and then for this thickness $t$ the phase difference $\varphi$ for other wavelengths $\lambda$ may be computed. Assuming a desired phase difference of one-quarter wavelength at approximately the center of the visible spectrum for quartz, it follows that $\varphi = 0.25$ and $k = 59.28$ for $\lambda = 0.55\mu$ from graph 40 of Fig. 7. Therefore, the thickness $t$ required to effect such phase difference is from Equation 4 $\varphi k$ or $59.28 \times 0.25$ or $14.82\mu$ (microns). For this thickness the phase difference $\varphi$ for any other wavelength may be computed as shown by graph 43 of Fig. 10. For example, at $\lambda = .400\mu$ from graph 40 of Fig. 7, $k = 42$ and $\varphi = .35$ as shown on graph 43 of Fig. 10. Corresponding phase differences $\varphi$ for an ADP plate $2.97\mu$ thick are shown on graph 44 of Fig. 11 and for a sodium nitrate plate $0.5425\mu$ thick on graph 45 of Fig. 12.

From the graphs 43, 44 and 45 of Figs. 10, 11 and 12, it is seen that for wavelengths to either side of $\lambda = 0.55$, the phase differences vary more and more from the quarter-wave value. The graphs 43 and 44 for quartz and ADP, respectively, are very similar, while graph 45 for sodium nitrate departs more rapidly for the shorter wavelength.

Since quartz and ADP are uniaxial crystals of opposite signs, they can be combined into a composite plate which shows less phase difference $\varphi$ than either quartz or ADP alone. Quartz and ADP plates of suitable thicknesses are combined so that $\varphi$ is the same for the Fraunhofer lines C and F (.6563 and .4861 micron, respectively) and $\varphi = 0.25$ for the D-line (.5893 micron). The necessary conditions are represented by the equations $$\varphi_C = \frac{t_a}{(k_a)_C} - \frac{t_b}{(k_b)_C} = \frac{t_a}{(k_a)_F} - \frac{t_b}{(k_b)_F} \quad (5)$$

and $$\frac{t_a}{(k_a)_D} - \frac{t_b}{(k_b)_D} = 0.25 \quad (6)$$

where $\varphi_C$ is the phase difference for the C-line and, therefore, by premise also for the F-line; $t_a$ and $t_b$ are the required thicknesses for the ADP and quartz plates, respectively; $(k_a)_C$, $(k_a)_F$ and $(k_a)_D$ are the known values of $k$ for the C-, F- and D-lines, respectively, for ADP and $(k_b)_C$, $(k_b)_F$ and $(k_b)_D$ are the known values of $k$ for the C-, F- and D-lines, respectively, for quartz from the table. Using the known values and solving Equations 5 and 6 it is found that for ADP the thickness is $t_a = 46.3\mu$ and for quartz the thickness is $t_b = 246\mu$. Using the values of $t_a$ and $t_b$ and values for $k$ and $k_b$ for other wavelengths $\lambda$ as obtained from graphs 41 and 40 of Figs. 8 and 7, respectively, the phase differences $\varphi \lambda$ for such other wavelengths $\lambda$ are obtained from the equation $$\varphi_\lambda = \frac{t_a}{(k_a)_\lambda} - \frac{t_b}{(k_b)_\lambda} \quad (7)$$

where $\varphi_\lambda$ is the phase difference produced by the composite plate for any desired wavelength $\lambda$; $t_a$ and $t_b$ are the thicknesses of the ADP and quartz plates, respectively; $(k_a)_\lambda$ is the value of $k$ for ADP from Fig. 8 for the desired wavelengths $\lambda$; and $(k_b)_\lambda$ is the value of $k$ for quartz from Fig. 7 for the desired wavelengths $\lambda$. Graph 15 of Fig. 13 shows the $\varphi$ versus $\lambda$ characteristic for the ADP-quartz composite wave plate.

Similar computations for an achromatic composite plate composed of quartz and sodium nitrate gives $103.5\mu$ as the thickness for quartz and $3.17\mu$ as the thickness for sodium nitrate. The phase difference versus wavelength characteristics for such a composite plate is shown by graph 46 of Fig. 14.

Graph 46 is convex upward while graph 15 of Fig. 13 is convex downward. Neither of these composite plates is entirely satisfactory throughout the visible spectrum.

According to this invention a more satisfactory achromatic composite wave plate is provided by combining plates of quartz, ADP and sodium nitrate of suitable thicknesses. Suitable thicknesses are arrived at by measurements of graphs 15 and 46. Such measurements indicate that phase differences one third those of graph 15 of Fig. 13 and two thirds those of graph 46 in Fig. 14 would be a much better characteristic. The necessary thicknesses for an apochromatic quarter-wave plate are arrived at by solving for ADP, quartz and sodium nitrate simultaneous equations of $\varphi$ at wavelengths $0.45\mu$, $0.55\mu$ and $0.65\mu$, all equal to 0.25. Each equation is of the form $$\frac{t_a}{(k_a)_\lambda} - \frac{t_b}{(k_b)_\lambda} + \frac{t_c}{(k_c)_\lambda} = 0.25 \quad (8)$$

where $t_a$, $t_b$ and $t_c$ are the thicknesses of ADP, quartz and sodium nitrate plates, respectively; $(k_a)\lambda$, $(k_b)\lambda$ and $(k_c)\lambda$ are the values of $k$ for ADP, quartz and sodium nitrate, respectively, for each desired value of $\lambda$ as obtained from graphs 41, 40 and 42 respectively. The thicknesses determined in this manner are $305\mu$ for quartz, $50.75\mu$ for ADP and $1.363\mu$ for sodium nitrate. The $\varphi$ versus $\lambda$ characteristic of such a composite plate is shown by graph 38 of Fig. 15.

From the foregoing description it is obvious how composite achromatic wave plates of other birefringent crystalline material may be designed. For best results very accurate optical data should be used and very close tolerances should be adhered to. That thin thicknesses are called for by the designed method of this invention is not troublesome because as explained hereinbefore, a thin plate of thickness $t$ can be simulated by two plates of the same material differing in thickness by $t$ and combined with the optical axes turned at right angles to each other. Attention is also called to the fact that in a manner similar to that described hereinbefore composite compensator plates may be designed to correct color defects of various optical devices such for example as crystal light valves. The $\varphi$ versus $\lambda$ graphs can be made concave either up or down or sloping either to the right or left.

The specific examples of composite wave plates described hereinbefore are composed of uniaxial birefringent crystalline material. Biaxial crystals may also be used. With plates from such biaxial crystals the major faces would be made parallel or perpendicular to the acute bisectors of the two optic axes, the thickness direction being the obtuse bisectrix, acute bisectrix or optic normal, these three being mutually perpendicular by nature. The orientation of the plates is determined by the parallelism of the acute bisectrix or optic normal. All such composite wave plates come within the purview of the appended claims.

It is to be understood that the hereinbefore described arrangements are illustrative of the application of the principles of the invention. Various other arrangements may be devised by those skilled in the art without departing from the spirit and scope of the invention.

What is claimed is:

1. An achromatic wave plate comprising a quartz crystal plate 246 microns thick, having substantially parallel major faces and a pair of ammonium dihydrogen phosphate plates each having substantially parallel major faces, the plates of said pair differing in thickness by 46.3 microns, said major faces being parallel to the optic axes of the respective plates and said plates being face to face with the optic axes of the quartz plate and the thicker ammonium dihydrogen phosphate plates parallel and normal to the optic axis of the thinner ammonium dihydrogen phosphate plate.

2. An apochromatic wave plate comprising a pair of quartz plates each having substantially parallel major faces, said quartz plates differing in thickness by 305 microns, a pair of ammonium dihydrogen phosphate plates each having substantially parallel major faces, said ammonium dihydrogen phosphate plates differing in thickness by 50.75 microns, and a pair of sodium nitrate plates each having substantially parallel major faces, said sodium nitrate plates differing in thickness by 1.363 microns, said major faces being parallel to the optic axes of the respective plates and said plates being face to face with the optic axes of each of the three thicker plates parallel and the optic axes of each of the three thinner plates parallel but turned at 90 degrees to the optic axes of the thicker plates, the thickness of the thinner plate of each of said pairs of plates being of the order of that required for mechanical strength during processing.

3. An apochromatic wave plate comprising a pair of quartz crystal plates each having substantially parallel major faces, said quartz plates differing in thickness by 305 microns, a pair of ammonium dihydrogen phosphate plates each having substantially parallel major faces, said ammonium dihydrogen phosphate plates differing in thickness by 50.75 microns, and a pair of sodium nitrate plates each having substantially parallel major faces, said sodium nitrate plates differing in thickness by 1.363 microns, said major faces being parallel to the optic axes of the respective plates, the plates of each said pair being face to face with their optic axes normal to each other, and the pairs being face to face with the optic axes of each of the three thicker plates parallel, the thinner plate of each of said pairs of plates being of the order of one millimeter in thickness.

4. A composite wave plate comprising at least three plates of uniaxial birefringent crystals, each plate having major faces substantially parallel to each other and to the optic axis of the respective crystals and exhibiting birefringence the amount of which varies with the wavelength of light passing through the plates from one major face to the other, two of said plates being of the same kind of crystal differing in thickness, said two plates being positioned face to face with the optic axes of said two plates substantially at right angles, and the optic axis of the thicker of said two plates being parallel to the optic axis of the third plate, the sum of the phase differences between the ordinary and extraordinary rays introduced by all of said plates taken together being equal to a quarter wavelength.

5. A composite wave plate comprising at least three plates of uniaxial birefringent crystals, each plate having major faces substantially parallel to each other and to the optic axis of the respective crystals and exhibiting birefringence the amount of which varies with the wavelengths of light passing through the plates from one major face to the other, two of said plates consisting of ammonium dihydrogen phosphate crystal differing in thickness, said two plates being positioned face to face with the optic axes of said two plates substantially at right angles and the optic axis of the thicker of said two plates substantially parallel to the optic axis of the third plate, the sum of the phase differences between the ordinary and extraordinary rays introduced by all of said plates taken together being equal to a quarter wavelength.

6. An apochromatic wave plate comprising a pair of quartz plates each having substantially parallel optically polished major faces, said quartz plates differing in thickness by 305 microns, a pair of ammonium dihydrogen phosphate plates each having substantially parallel major faces, said ammonium dihydrogen phosphate plates differing in thickness by 50.75 microns, and a pair of sodium nitrate plates each having substantially parallel major faces, said sodium nitrate plates differing in thickness by 1.363 microns, said major faces being parallel to the optic axes of the respective plates, and said plates being face to face with the optic axes of each of the three thicker plates and the optic axes of each of the three thinner plates parallel but turned at 90 degrees to the optic axes of the thicker plates, the thickness of the thinner plate of each of said pairs of plates being of the order of that required for mechanical strength during processing, the birefringent axis of greatest ease of vibration and fastest propagation for light waves parallel thereto being parallel to the optic axis for the sodium nitrate and ammonium dihydrogen phosphate plates and perpendicular to the optic axis and parallel to the major faces for the quartz plates, and the birefringent axis of least ease of vibration and slowest propagation for light waves parallel thereto being perpendicular to the optic axis and parallel to the major faces for the sodium nitrate and ammonium dihydrogen phosphate plates and parallel to the optic axis for the quartz plates.

7. An apochromatic optical plate comprising three pairs of crossed uniaxial birefringent optical plates, each of said six plates having two substantially parallel major faces cut substantially parallel to the optic axis of the materials, both plates of each crossed pair being of the same material, each pair of plates having different frequency birefringence characteristics than each of the others, the effective optic axis of each pair of plates being parallel with the other two pairs, and the proportionate effective thicknesses of the plates of said three different materials being given by the relationships:

$$\frac{t_a}{(k_a)_{\lambda_1}} - \frac{t_b}{(k_b)_{\lambda_1}} + \frac{t_c}{(k_c)_{\lambda_1}} =$$

$$\frac{t_a}{(k_a)_{\lambda_2}} - \frac{t_b}{(k_b)_{\lambda_2}} + \frac{t_c}{(k_c)_{\lambda_2}} =$$

$$\frac{t_a}{(k_a)_{\lambda_3}} - \frac{t_b}{(k_b)_{\lambda_3}} + \frac{t_c}{(k_c)_{\lambda_3}} = \varphi$$

where $t_a$, $t_b$, and $t_c$ are the effective thicknesses of the three types of materials, $k$ stands for the particular value of wavelength divided by the birefringence for the particular material $a$, $b$, or $c$ in the direction normal to the major faces at the wavelengths $\lambda_1$, $\lambda_2$, and $\lambda_3$, where the birefringence of one of the materials represented by $k_b$ is of the opposite sign as that of the other two materials, and where $\varphi$ is the desired phase difference of the plate.

8. The apochromatic optical plate as set forth in claim 7 wherein $\varphi = 0.25$.

WALTER L. BOND.

REFERENCES CITED

The following references are of record in the file of this patent:

UNITED STATES PATENTS

| Number | Name | Date |
|---|---|---|
| 1,926,716 | Ehringhaus | Sept. 12, 1933 |
| 2,409,853 | Heijn | Oct. 22, 1946 |
| 2,412,074 | Benford | Dec. 3, 1946 |
| 2,420,252 | Land | May 6, 1947 |
| 2,420,273 | West | May 6, 1947 |
| 2,423,357 | Watrobski | July 1, 1947 |
| 2,441,049 | West | May 4, 1948 |
| 2,442,790 | Warner | June 8, 1948 |
| 2,467,325 | Mason | Apr. 12, 1949 |
| 2,493,200 | Land | Jan. 3, 1950 |

FOREIGN PATENTS

| Number | Country | Date |
|---|---|---|
| 378,742 | Great Britain | Aug. 13, 1932 |

OTHER REFERENCES

Wright, "Text on Light," pages 356–358 inc. Published by MacMillan & Co., New York, 1892. Copy in Division 7.